Nov. 1, 1966    K. F. UMPLEBY ETAL    3,283,226
RESONANT REED ASSEMBLY
Filed Jan. 7, 1965    2 Sheets-Sheet 1
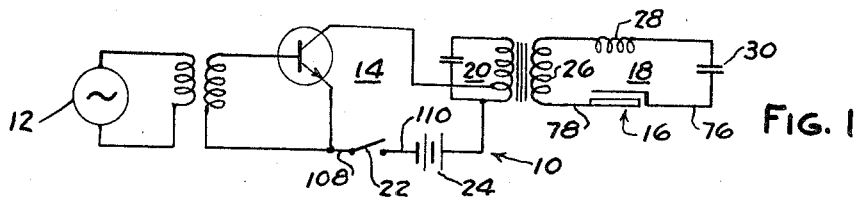
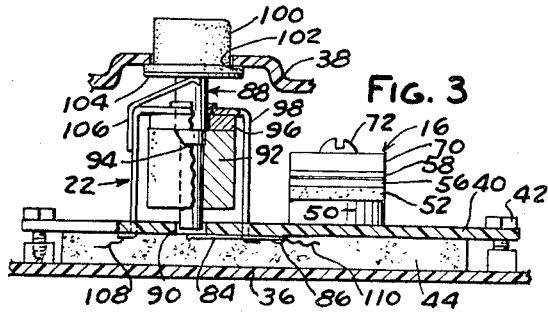
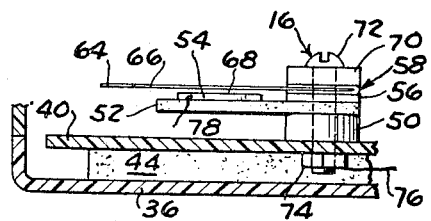
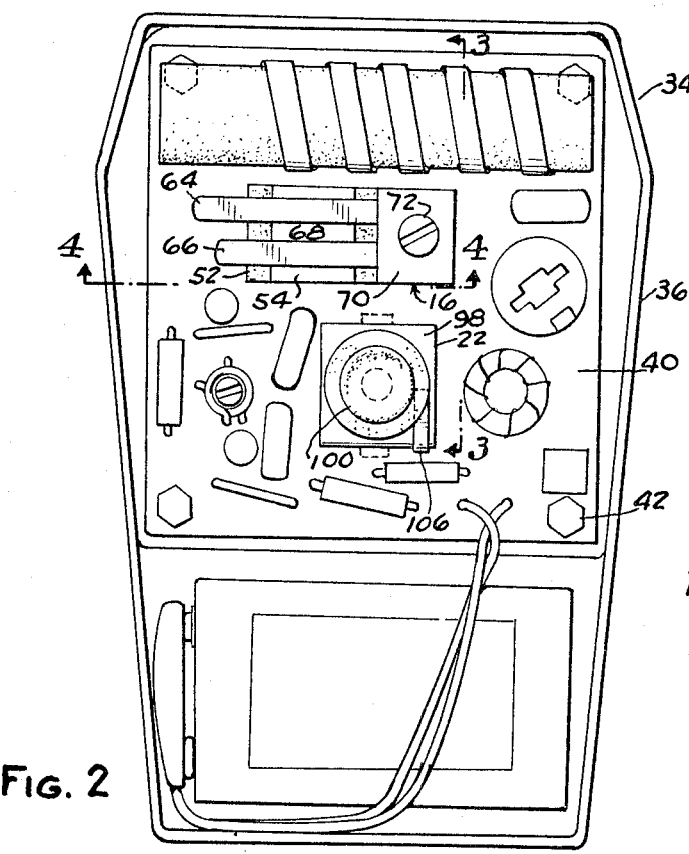
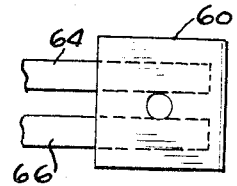
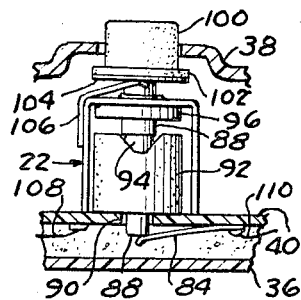
INVENTORS
KENNETH F. UMPLEBY
& RALPH M. WRIGHT
BY
Barnes, Kisselle, Raisch & Choate
ATTORNEYS

INVENTORS
KENNETH F. UMPLEBY
& RALPH M. WRIGHT

3,283,226
RESONANT REED ASSEMBLY
Kenneth F. Umpleby and Ralph M. Wright, Ann Arbor, Mich., assignors to Berry Industries, Inc., Birmingham, Mich., a corporation of Michigan
Filed Jan. 7, 1965, Ser. No. 424,094
5 Claims. (Cl. 317—249)

This invention relates to resonant reeds and in particular to a resonant reed assembly which serves as a variable capacitance in response to shock excitation.

The objects of this invention are to provide a resonant reed assembly that is constructed simply and economically; that achieves effective capacitive variations when the reeds vibrate; and that may be shock excited by a mechanical impulse created remote from the reeds.

In the drawings:

FIG. 1 is an electrical circuit diagram of a remote control transmitter which is amplitude modulated in accordance with capacitive variations provided by a reed assembly constructed in accordance with the present invention.

FIG. 2 is a top view of a transmitter case with the cover removed to illustrate the construction and placement of transmitter parts including the reed assembly.

FIG. 3 is a view taken on line 3—3 of FIG. 2 to illustrate the reed assembly constructed in accordance with the present invention and a snap-action switch for shock exciting the reeds into vibration.

FIG. 3A is a view of the snap-action switch in an operated or closed position.

FIG. 4 is a side view of the reed assembly taken on line 4—4 of FIG. 2.

FIG. 5 is a side view of a U-shaped clamp in which a pair of reeds are mounted.

FIG. 6 is a top view of the clamp and reeds shown in FIG. 5.

Figure 7:
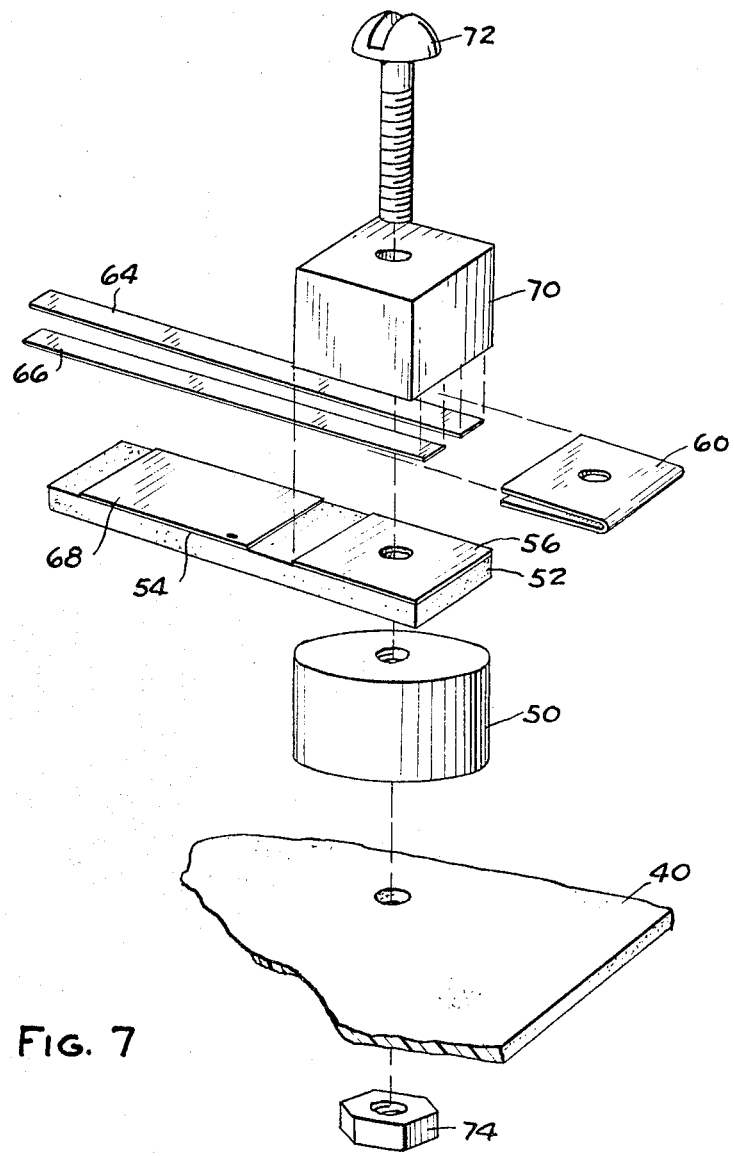
FIG. 7 is an exploded view of the reed assembly.

FIG. 1 shows the electrical circuit of a portable transmitter 10 in which a carrier signal from a source 12 is amplitude modulated by an amplifier 14 in accordance with capacitive variations in a vibrating reed assembly 16. Assembly 16 is connected in a secondary circuit 18 which in turn is coupled to a tank circuit 20 in amplifier 14. A switch 22 is arranged to connect amplifier 14 to a battery 24 and simultaneously create a shock impulse which is transmitted to reed assembly 16. Secondary circuit 18 includes a secondary winding 26 coupled magnetically to tank 20 and connected in series with a high-Q coil 28, a trimer capacitor 30, and reed assembly 16.

Transmitter 10 generally comprises a two-piece plastic case 34 (FIGS. 2, 3, and 4) formed with a base 36 and a cover 38 (FIG. 3). A circuit board 40 is floatably mounted on base 36 interiorly of case 34 by four screws 42 and a sponge rubber pad 44. Screws 42 are threaded into base 36 to limit upward travel of board 40 as viewed in FIG. 3. Pad 44 is compressed between board 40 and base 36 to yieldably urge the board away from the base.

In accordance with one aspect of this invention, reed assembly 16 comprises a heavy brass base 50 which supports a flat fiberglass board 52 in spaced relation to board 40. Board 52 projects laterally outwardly of base 50 and has a flat metal plate 54 mounted thereon laterally outwardly of base 50 adjacent the free end of board 52. Resting on and disposed above board 52 is a flat spacer 56 which in turn supports a reed subassembly 58. Subassembly 58 comprises a U-shaped reed clamp 60 (FIGS. 5 and 6) and a pair of flexible reeds 64, 66, one end of each reed being clamped between the legs of clamp 60. Clamp 60 is made of brass and emersed in molten solder with the ends of reeds 64, 66 disposed therein to form a unity assembly. Reeds 64, 66 project laterally outwardly from clamp 60 so as to be spaced above and overlie an upper face 68 of plate 54. Resting on reed assembly 58 is a heavy brass block 70. Base 50 and block 70 have a relatively large mass to improve the vibration characteristics of reeds 64, 66. Board 40, base 50, board 52, spacer 56, reed subassembly 58, and block 70 are all perforated to accommodate a screw 72 therethrough. A nut 74 is threaded on the lower end of screw 72 below board 40 to clamp the parts together and to board 40. Nut 74 may be soldered to screw 72 together with a lead 76 (FIGS. 1 and 4) for electrically connecting reeds 64, 66 to capacitor 30. Plate 54 is electrically connected to winding 26 by a lead 78 (FIGS. 1 and 4).

Reeds 64, 66 are substantially identical except in length so that they have different resonant vibration frequencies. Reeds 64, 66, together with plate 54, form a capacitance which varies in accordance with the vibration frequency of the reeds when the reeds vibrate. Reeds 64, 66 are formed of commercialy available alloy steels that minimize the effect of ambient temperature variations and have desirable elasticity characteristics. The free end, left end as viewed in FIGS. 2 and 4, of each reed 64, 66 extends laterally outwardly beyond plate 54 so that regardless of the length of the reed, a substantially equal reed area will overlie plate 54. With this construction, the capacitance of reed assembly 16 will be substantially the same regardless of the length of the reeds. Thus, different reeds and pairs of reeds can be used interchangeably without substantially modifying the other circuit components shown in FIG. 1.

Switch 22 comprises a flexible contact arm 84 having one end fixedly mounted on board 40 as at 86. The other or free end of arm 84 is disposed beneath the lower end of a metal shaft 88 which is vertically slidable through an aperture 90 in board 40. An annular permanent magnet 92 is disposed on shaft 88 and downwardly movable therewith by means of a shoulder 94 on shaft 88. Magnet 92 is retained in an upper position as viewed in FIG. 3 by an annular collar or keeper 96 formed of magnetic material and mounted on a U-shaped bracket 98. Bracket 98 is in turn mounted on board 40.

Shaft 88 extends upwardly through bracket 98 and has a push button 100 fixedly mounted on its upper end. Button 100 projects upwardly through a suitable aperture in cover 38. Button 100 has a lower radial flange 102 which engages the lower face of cover 38 when shaft 88 is in its uppermost position. A metal washer 104 is fastened on shaft 88 at the bottom of flange 102 to engage the free end of a metal spring leaf 106 mounted on bracket 98. Washer 104 and leaf 106 assure an electrical connection between shaft 88 and bracket 98. A lead 108 (FIGS. 1 and 3) connects bracket 98 to amplifier 14. A lead 110 (FIGS. 1 and 3) connects arm 84 to battery 24.

When button 100 is pushed downwardly as viewed in FIG. 3, the magnetic coupling between magnet 92 and keeper 96 is broken with a snapping action so that magnet 92 strikes board 40 with sufficient impact to establish a mechanical impulse or shock which is transmitted through board 40 to reed assembly 16 to initiate vibration of reeds 64, 66. Simultaneously, shaft 88 contacts arm 84 to connect amplifier 14 to battery 24. When button 100 is released, magnet 92 snaps back into engagement with keeper 96 and disengages shaft 88 from arm 84. As reeds 64, 66 vibrate, the capacitance of reed assembly 16 in the secondary circuit 18 varies in accordance with the reed vibration frequency.

Although the use of capacitive variations in reed assembly 16 does not form a necessary part of this invention, by way of further illustration, the capacitive variations amplitude modulate the carrier signal from source 12. In general, tank circuit 20 is tuned to parallel resonance at the carrier frequency of source 12. Source 12 should provide a stable carrier frequency as by use of a crystal-controlled oscillator. Secondary circuit 18 is tuned reactively just off series resonance in a direction such that when reeds 64, 66 vibrate, secondary circuit 18 is tuned toward and away from series resonance for the carrier frequency of source 12 in accordance with the reed vibration frequencies. Thus, tank circuit 20 and secondary circuit 18, taken together, are tuned reactively for the carrier frequency of source 12 in a direction such that when reeds 64, 66 vibrate to tune the secondary circuit 18 toward and away from series resonance, the tank circuit 20 is tuned toward and away from parallel resonance thereby modulating current in tank circuit 20 and hence power radiated therefrom in accordance with capacitive variations in reed assembly 16.

What is claimed is:

1. A reed assembly comprising a base, a flat insulating board mounted on said base, a flat conductor mounted on one face of said board, a spacer mounted on said board remote from said conductor, a flexible reed, and rigid means mounting said reed and said board on said base such that one end of said reed is rigidly and mechanically fixed to said board with said spacer interposed therebetween and the other end of said reed extends in a direction laterally outwardly from said fixed end and overlies said conductor in spaced relation thereto, to define an air gap therebetween which varies with flexure of the reed, said reed being electrically insulated from said conductor by said board and being formed of conductive material to provide a capacitance between said conductor and said reed whereby when said reed vibrates the capacitance between said reed and said conductor varies in accordance with the resonant vibration frequency of said reed.

2. A reed assembly comprising a base, a flat insulating board mounted on said base, a flat conductor mounted one one face of said board, a spacer mounted on said board remote from said conductor, a flexible reed, means mounting said reed on said base such that one end of said reed is fixed to said board with said spacer interposed therebetween and the other end of said reed extends in a direction laterally outwardly from said fixed end and overlies said conductor in spaced relation thereto, said reed being electrically insulated from said conductor by said board and formed of conductive material to provide a capacitance between said conductor and said reed, and a second reed having one end fixedly mounted on said base such that one end of said second reed is fixed to said board with said spacer interposed therebetween, the other end of said second reed being free and projecting laterally outwardly from its fixed end over and beyond said conductor in spaced relation thereto, said reeds having different lengths and being otherwise substantially identical whereby when said reeds vibrate the capacitance between said reeds and said conductor varies in accordance with the resonant vibration frequency of said reeds.

3. In combination, a board and a reed assembly mounted on said board, said reed assembly comprising a base mounted on said board and having an upper flat face, a flat plate formed of electrical insulating material mounted on said face of said base and projecting laterally outwardly therefrom in spaced relation to said board, a flat conductor mounted on an upper face of said plate laterally outwardly of said base, a spacer resting on said board laterally inwardly of said conductor, a reed subassembly mounted on said spacer with said spacer disposed between said subassembly and said plate, said subassembly comprising a U-shaped clamp and a pair of reeds, one end of each reed being rigidly fixed in said clamp with said clamp abutting said spacer, the other end of each of said reeds being free and extending laterally outwardly from said spacer and overlying said conductor in spaced relation thereto to define an air gap between said flat conductor and each of said reeds, said free ends of said reeds extending laterally outwardly over and beyond said conductor, a block resting on said clamp with said clamp disposed between said block and said spacer, said board, said base, said plate, said spacer, said clamp, and said block having aligned apertures therethrough, and a fastener projecting through said apertures to clamp said reed assembly together, fixedly mount said reed assembly on said board and rigidly mechanically fasten said reed subassembly to said plate.

4. A capacitive reed assembly constructed and adapted to be used with generally flat reeds of different lengths, the shortest of which has a predetermined minimum length, said reeds being made of electrically conductive material and other than length being substantially identical, said assembly comprising a flat plate having an integral electrically conductive portion, mounting means supporting one of said reeds and said plate in stacked relation such that one end of said one reed is rigidly and mechanically connected to said plate but electrically insulated from said conductive plate portion thereof, said plate and said one reed projecting laterally outwardly from said mounting means in spaced generally parallel relation to provide an air gap between said one reed and said conductive plate portion so that the air gap varies with flexure of the reed, said one reed having a length greater than said predetermined minimum length, said conductive portion of said plate having a laterally outer extremity disposed relative to said mounting means so that a reed of said predetermined minimum length extends laterally outwardly beyond said conductive plate portion and thus a substantially equal area of reeds having different lengths but being otherwise substantially identical will overlie said conductive plate portion, and conductor means connected across said reed and said conductive portion of said plate to provide a pair of output terminals presenting a capacitive reactance which varies at the resonant frequency of said one reed in response to the vibration of said one reed whereby the capacitive reactance of said assembly will be substantially the same for reeds of different lengths.

5. The reed assembly set forth in claim 4 wherein a second reed is supported by said mounting means in stacked relation with said plate and side-by-side to said one reed, said second reed also having a length greater than said predetermined minimum length so that said second reed extends laterally outwardly beyond said conductive plate portion.

References Cited by the Examiner

UNITED STATES PATENTS

| | | | |
|---|---|---|---|
| 2,027,074 | 1/1936 | Miessner | 331—156 X |
| 2,542,611 | 2/1951 | Zuck | 317—250 X |
| 3,020,455 | 2/1962 | Reifel | 317—250 |
| 3,192,456 | 6/1965 | Reifel | 317—250 |

LEWIS H. MYERS, *Primary Examiner.*

ROBERT K. SCHAEFER, *Examiner.*

E. GOLDBERG, *Assistant Examiner.*